US007764683B2

(12) United States Patent
DiGiorgio et al.

(10) Patent No.: US 7,764,683 B2
(45) Date of Patent: Jul. 27, 2010

(54) RELIABLE MULTICAST OPERATING SYSTEM (OS) PROVISIONING

(75) Inventors: Rinaldo S. DiGiorgio, Easton, CT (US); Raymond Maslinski, Rochester, NY (US); Dan Hushon, Chantilly, VA (US)

(73) Assignee: Oracle America, Inc., Redwood City, CA (US)

( * ) Notice: Subject to any disclaimer, the term of this patent is extended or adjusted under 35 U.S.C. 154(b) by 1223 days.

(21) Appl. No.: 11/303,829

(22) Filed: Dec. 16, 2005

(65) Prior Publication Data
US 2007/0140242 A1 Jun. 21, 2007

(51) Int. Cl.
*H04L 12/26* (2006.01)
(52) U.S. Cl. ........................... 370/390; 370/401
(58) Field of Classification Search .................. 709/219
See application file for complete search history.

(56) References Cited

U.S. PATENT DOCUMENTS

| 5,832,493 | A * | 11/1998 | Marshall et al. ............ 707/101 |
| 6,331,983 | B1 * | 12/2001 | Haggerty et al. ............ 370/400 |
| 6,556,544 | B1 | 4/2003 | Lee |
| 6,567,774 | B1 * | 5/2003 | Lee et al. ...................... 703/23 |
| 2001/0037472 | A1 | 11/2001 | Li |
| 2002/0029283 | A1 * | 3/2002 | Beckett et al. ............... 709/231 |
| 2002/0059526 | A1 * | 5/2002 | Dillon et al. ................. 713/201 |
| 2003/0200290 | A1 * | 10/2003 | Zimmerman et al. ........ 709/222 |
| 2003/0236863 | A1 * | 12/2003 | Johnson et al. .............. 709/219 |
| 2004/0268340 | A1 * | 12/2004 | Steeb et al. .................. 717/174 |
| 2005/0041665 | A1 | 2/2005 | Weyman et al. |
| 2005/0157720 | A1 | 7/2005 | Chandhok et al. |
| 2005/0282571 | A1 | 12/2005 | Oprescu-Surcobe et al. |
| 2006/0090069 | A1 * | 4/2006 | Burokas et al. .............. 713/163 |
| 2007/0028133 | A1 * | 2/2007 | Izutsu et al. ..................... 714/4 |

* cited by examiner

*Primary Examiner*—Chirag G Shah
*Assistant Examiner*—Daniel Mitchell
(74) *Attorney, Agent, or Firm*—Marsh Fischmann & Breyfogle LLP; Kent A. Lembke; Libby A. Huskey

(57) ABSTRACT

A method and corresponding system for multicast provisioning of operating systems (OS) at reduced bandwidth. The method includes providing a computing device on a digital communications network. An OS image is stored in the computing device, with the image including data sets or chunks making up one or more phases of a system image. The method continues with associating a single multicast address with each of the data sets. The computing device broadcasts each of the data sets of the image along with the associated multicast address on the network as a repeating loop. The method includes sending a signal from the computing device to a set of nodes on the network to initiate a process for loading the stored image, and in response, operating the nodes to load a multicast installer that listens for the data sets and buffers received data packets in an image cache.

15 Claims, 5 Drawing Sheets

RELIABLE MULTICAST OPERATING SYSTEM (OS) PROVISIONING

BACKGROUND OF THE INVENTION

1. Field of the Invention

The present invention relates, in general, to distributing and provisioning software applications in a distributed computing environment and in networked computer systems, and, more particularly, to a method and corresponding system for reliably provisioning an operating system to numerous nodes or client devices in a networked computer system with reduced bandwidth requirements.

2. Relevant Background

The growth in computer networks and distributed computing environments has led to a parallel growth in the need for methods and services for managing the operation of hardware devices operating on such networks. For example, there has been a recent demand for improved techniques for loading or provisioning software onto devices, such as network nodes, client computing devices, and other electronic/computer devices, that are linked to a communication network, such as the Internet, an intranet, a local area network (LAN), a wide area net (WAN), or other network used to link computer devices. A new version of a software application may be developed, and it is desirable to reliably provision it or deliver and load it remotely to numerous devices (or "nodes") over a communications to a network. The use of communication networks, such as the Internet and local intranets, has significantly improved the efficiency of provisioning new software versions and new software applications, but provisioning services and techniques have also created new problems and issues for network and computer system administrators.

The issue of how to provision a large application, such as an operating system (OS), has proven particularly difficult to resolve. Many computer systems may include a large number of nodes or devices that participate in a shared network and that at a particular time may require complete or individualized reloading of the operating system (OS) in a relatively quick manner to support a new configuration for the shared system. A common present practice for provisioning of an OS in such a computer system is to use a point-to-point network approach in which a separate copy of the OS is transmitted to each node. While effective for achieving provisioning especially where the images have high differentials, such a provisioning method, at scale, results in unacceptable network traffic congestion and also undesirably ties up the image server until provisioning of all nodes is completed.

Existing provisioning techniques may be labeled as unicast provisioning techniques in which the device or server providing the OS image talks directly with each receiving node or network device. OS files are often very large, and their size and complexity can make them difficult to send across networks without interruptions, without taking up large amounts of network bandwidth, and/or without interrupting other data being sent on the network. In such a conventional provisioning model, data packets (such as Internet Protocol (IP) packets) are sent using unicast or host-to-host transmission in which each computer involved in the provisioning can transmit and receive packets, which are labeled with the address of the receiving computer or node. Each computer or node listens to all the other packets that are sent in the network and looks for packets that contain its address. When a computer or node encounters a packet that is addressed to it, it interrupts the processor for processing.

Unicasting is useful for communicating directly with one or a few other computers, but when it is desirable to communicate with a large number of computers or nodes (such as is often the case in network provisioning), unicasting becomes very inefficient because a copy of each packet of a provisioned application or image must be sent to every receiving unicast address. Unicasting uses up network bandwidth quickly and particularly, when the file or application being transmitted is a large and/or complex file such as an OS file or image especially when there are large numbers of nodes that are simultaneously trying to accomplish similar tasks.

Due to these limitations with existing provisioning methods, there is a growing demand for more effective ways to achieve provisioning in a computer system having numerous computer devices or nodes that are communicatively linked by a communications network. Preferably, such a system and method would significantly reduce the amount of time and network bandwidth that is required for provisioning a software application and particularly for provisioning complex files such as an OS to a large number of nodes.

SUMMARY OF THE INVENTION

The present invention addresses the above and other problems by providing a multicast provisioning method, and corresponding systems, for provisioning complex software applications or system images, such as an operating system (OS), on networked client devices or nodes. Generally, the provisioning method involves using a source or image server to store a master image, such as an OS image, and to broadcast the image as a stream of packets, with each packet being addressed to a multicast group address rather than to each node. The broadcast image is in some cases divided into a series of image phases, with each phase being divided into two or more data sets or chunks, which facilitates verification of receipt by a listening receiver or node and later loading or installation at the receiving node. The method may include repeatedly broadcasting the image (or its phases/chunks) to allow listening receivers or nodes to begin caching or buffering midstream, and in these cases, a node may request missed data from the source server and/or from peers in its multicast group or subnet or wait for the data to be rebroadcast. Bandwidth usage is significantly reduced in the provisioning method as the image server only transmits a single stream rather than a stream for each receiving node.

More particularly, a method is provided for provisioning software including operating systems at reduced aggregate network load as compared with unicast provisioning. The method includes providing a computing device such as a server or the like with memory on a digital communications network. An image of an application, such as an OS image, is stored in the memory of the computing device, and the image typically is made up of a number of data sets (e.g., data sets or chunks making up one or more phases of an image with two or more phases being used in some embodiments to represent an image). The method continues with associating a single multicast address with each of the data sets, e.g., a group address corresponding to a subnet of nodes or clients on a network or corresponding to all users of a particular application such as a particular OS. The computing device then is instructed to broadcast each of the data sets of the image along with the associated multicast address on the network and in many embodiments, the broadcasting is repeated at least once such that a looping stream of the image is multicast to all receivers or nodes listening for data sets or packets having the particular group address. The method may also include prior to broadcasting sending a signal from the computing device to a set of nodes on the network to initiate a process for loading the stored image, and in response, the nodes operate to load a multicast installer either from BIOS or a minimal boot image that listens for the broadcast data sets and stores or buffers data packets or data sets having the group address in an image cache or in memory associated with the node for later loading of the image on the node.

According to another aspect of the invention, a method for provisioning an operating system to nodes or clients is provided that includes loading a multicast installer on a plurality of nodes linked to a communications network. Then, at each of the nodes, a number of steps occurs including operating the multicast installer to listen on the network for and to identify multicast packets having a particular multicast group address and then to cache each of such identified packets. Then, the multicast installer acts to determine when a minimum portion of a provisioned image is received and/or cached to proceed to a next provisioning state, and when this occurs, to install the cached multicast packets at the particular node. The provisioned image is, in some cases, divided into two or more phases and each of these phases is divided into two or more chunks, with the multicast packets providing data for the chunks. The multicast installer may determine that one or chunks is missing from its cache for a particular phase and respond by continuing the listening until it is received (such as in a next broadcast of the image on the network) or by requesting the missing chunks from another one of the nodes and/or from a source or image server that is broadcasting the multicast packets. Lastly, a counter mechanism is envisioned that can be incremented/decremented to allow the image server to recognize a state change, e.g., establishing of the first listener, completion by the last listener, which could serve to reduce/remove the multicast when there are no clients, and the like.

DETAILED DESCRIPTION OF THE PREFERRED EMBODIMENTS

Figure 1:
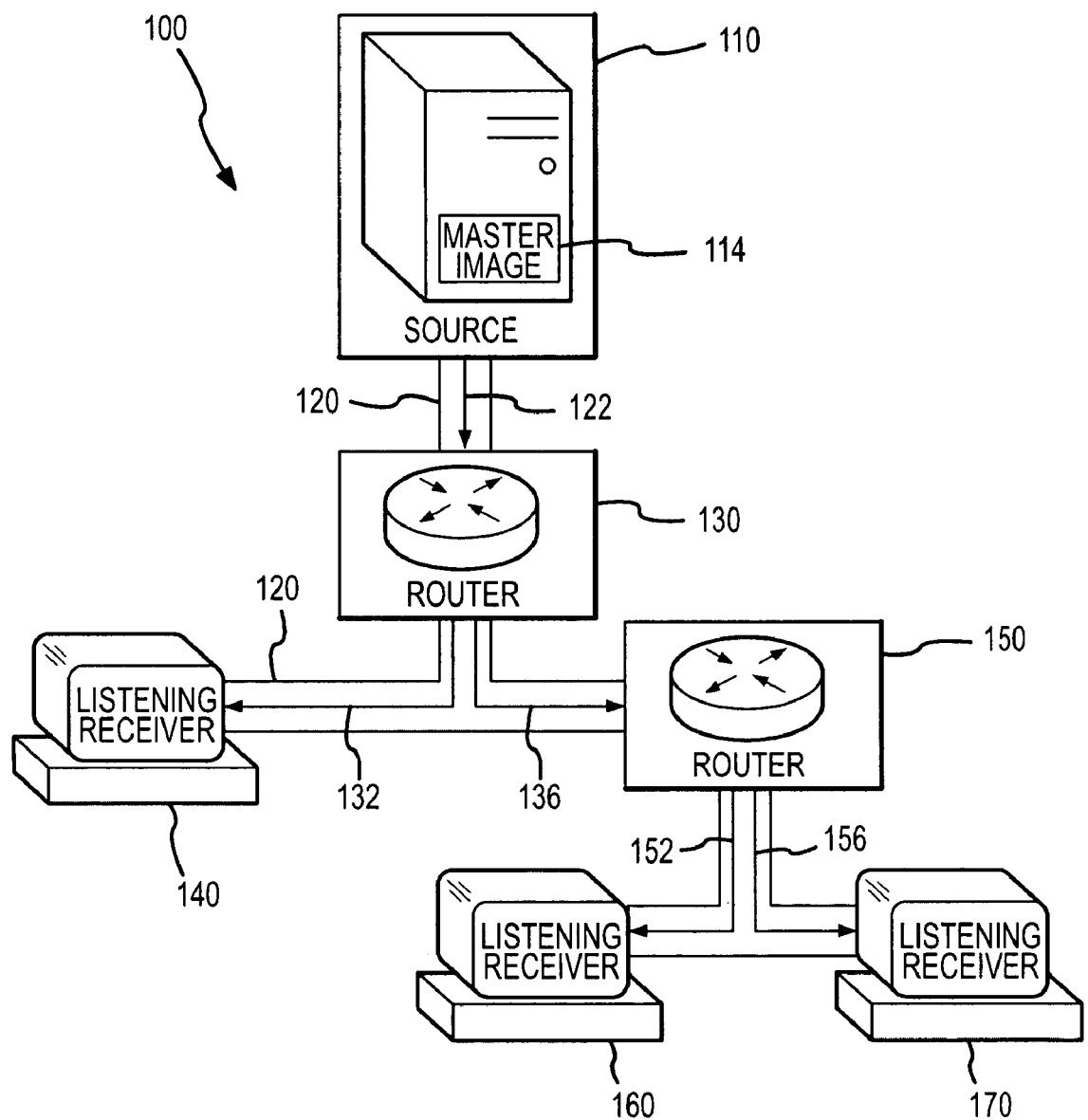
FIG. 1 illustrates a provisioning system configured according to one embodiment of the invention for multicast provisioning of an operating system (OS) or a software application image.

In brief, the invention is directed to software or application provisioning methods and systems that are adapted to use multicasting to deliver an operating system (OS) or other software or applications on a multicast channel of a digital communications network. The systems and methods described herein allow provisioning at greatly reduced network load when provisioning to numerous nodes or client devices. For example, many computer systems have hundreds or more nodes that may require reloading of the OS (or portions thereof) quickly for support of a new configuration across a target set of these nodes. Prior techniques used point-to-point network approaches such as unicasting in which each node was sent a separate copy of the OS from a source server. In contrast, the systems and methods of the present invention utilize multicasting and other techniques to provision 1 to 100 or 1000 or more nodes in the same amount of time as each node in a multicast subnet or group is substantially concurrently receiving a copy of the OS image.

To achieve such provisioning, a provisioning system may include a multicast provisioner at one or more image sources (e.g., image servers) that multicast OS data for an enterprise or computer system or network. Multicast installers or listeners are provided on each participating node or client/network device to listen for relevant streams and to install the images appropriately using additional configuration information. Multicast jump hosts or caching hosts can be used to span subnets or security domains by establishing trusted and exact replicas. Briefly, a provisioning method may include nodes being given a signal to reload an OS (or other software application), and in response, the nodes each load a multicast installer. The multicast installer operates to wait (or listen on the network) for the OS stream from the multicast provisioner. The multicast provisioner operates to multicast the OS or other image on the network with each phase or data chunk within a phase including a particular multicast address corresponding to the multicast group or subnet that includes the nodes that received the reload signal. The multicast installers on the 1 to n nodes listen and install the images. The multicast OS provisioning techniques of the invention allow "n" nodes to be loaded in the same (or substantially the same) amount of time as required for loading one device or node because the OS provisioning is performed in parallel. Hence, network usage or bandwidth is decreased in proportion to the number of nodes when compared with unicast provisioning, which allows large networks or grids to be quickly and efficiently reconfigured.

In the following discussion, computer and network devices, such as the software and hardware devices within the systems 100, 200, and 300, are described in relation to their function rather than as being limited to particular electronic devices and computer architectures and programming languages. To practice the invention, the computer and network devices or elements or nodes, e.g., image and backup servers and node/client devices in FIG. 1-3, may be any devices useful for providing the described functions, including well-known data processing and communication devices and systems, such as application, database, web, blade, and entry level servers, midframe, midrange, and high-end servers, personal computers and computing devices including mobile computing and electronic devices with processing, memory, and input/output components running code or programs ("applications", "tasks" within such applications, and "services") in any useful programming language, and server devices configured to maintain and then transmit digital data over a wired or wireless communications network. Data storage systems and memory components are described herein generally and are intended to refer to nearly any device and media useful for storing digital data such as volatile memory, non-volatile memory, or disk-based devices, their controllers or control systems, and any associated software. Data, including transmissions to and from the elements of the network 100, 200 and among other components of the network/systems 100, 200, typically is communicated in digital format following standard communication and transfer protocols, such as TCP/IP, HTTP, HTTPS, FTP, and the like, or IP or non-IP wireless communication protocols.

The invention utilizes multicast or multicasting to provision images, such as OS images, to nodes, and as such, the invention utilizes protocols and services useful in multicasting that are in existence or that may later be developed to perform multicasting such as IPv4 or IPv6 multicast addressing, Internet Group Management Protocol (IGMP) version 1, 2, 3, or later, Multicast Listener Discovery (MLD), snooping, and multicast routing protocols (e.g., dense and/or sparse mode protocols). Hence, the devices described for performing multicasting are intended to include necessary hardware and software to support multicasting and are not intended to be limited to those components shown or described.

FIG. 1 illustrates an exemplary multicast provisioning system 100 according to the present invention. The system 100 includes a source 110 with memory storing a master image 114 that is linked to a digital communications network shown in this example to include a pair of routers 130, 150 and communication links or fiber 120. For example, the source 110 may include a server that is used to store an image of an OS for which it is desirable to provision over a network to a number of nodes or listening receivers 140, 160, 170 (e.g., network or computer devices). During operation, the source 110 acts to signal the listening receivers 140, 160, 170 that a reloading or initial loading of an application such as an OS is to be performed, and each receiver 140, 160, 170 loads installer services or programs (as discussed with relation to FIGS. 2-5) and begins to listen for the multicast of an image stream, e.g., a stream made up of one or more phases that are in turn each, optionally, divided into data sets or chunks on the channels or fibers 120. The routers 130, 150 receive the transmitted stream 122 and selectively route the stream 132, 136, 152, 156 to the various listening receivers 140, 160, 170 based on a multicast address provided in each packet of a data chunk or phase sent by the source 110 to provision the master image 114 to appropriate nodes 140, 160, 170.

With multicast provisioning, the sending computer or source 110 sends out one stream of packets as represented by 122 that are addressed to the multicast group's address (e.g., the group of receivers or nodes 140, 160, 170). The listening receivers 140, 160, 170 or a subset of these that are interested in receiving the data are programmed or run programs, such as the multicast installer described below, to listen for data that has these addresses. Unicast provisioning sends a separate stream of data to each receiver, but in contrast, the multicast technique of the present invention includes the source 110 sending one stream of data 122 onto network 120 that is separated as it passes through the routers 130, 150 and sent on as streams 132, 136, 152, 156 to the receivers 140, 160, 170. Bandwidth is preserved with only one stream 122 being used, and the efficiency of the provisioning of the image 114 is greatly improved relative to unicast provisioning. Packets in streams 122 are only sent where they are needed as the clients 140, 160, 170 are programmed as listening receivers to listen only for one or more particular multicast address. In this manner, such addresses can be thought of as provisioning addresses that may have relevance to various subsets or subnets within a computer system, e.g., nodes running a particular OS, application, or the like, and when provisioning is performed that affects that subset or subnet, each node in that subset or subnet listens for packets or data chunks containing that address (or more than one multicast address may be listened to by each receiver 140, 160, 170 depending on what applications they are interested in receiving).

The provisioning or multicast address identifies a transmission session rather than a specific physical destination or host. All of the receivers 140, 160, 170 in a particular provisioning (or multicast) group or subnet are identified by a single IP address. For example, a provisioning group or subnet may be defined that are running a particular OS (or other application). Each of these nodes 140, 160, 170 would be programmed to listen for data streams having such a provisioning or multicast address, and such addresses may be provided by the source 110 per a standard IP protocol used for multicasting such as IPv4, IPv6, or the like. In some cases, the provisioning or multicast address may include a group identification or group ID which corresponds to a set of the nodes in a particular network or computer system, such as system 100. In some embodiments, multicast listener discovery (MLD) may be used by source 110 to identify the listening receivers 140, 160, 170 for a particular multicast address and/or MLD snooping may be used by switches and/or routers 130, 150 to increase provisioning efficiency by enabling the switches/routers 130, 150 to forward multicast data 122 to hosts or receiving nodes 140, 160, 170 only if they want to receive the data 122 (rather than to all ports regardless of whether or not they want to receive the data 122). With a general understanding of a representative system 100 of the invention, more specific examples of provisioning systems 200 and 300 will be explained with reference to FIGS. 2-5.

Figure 2:
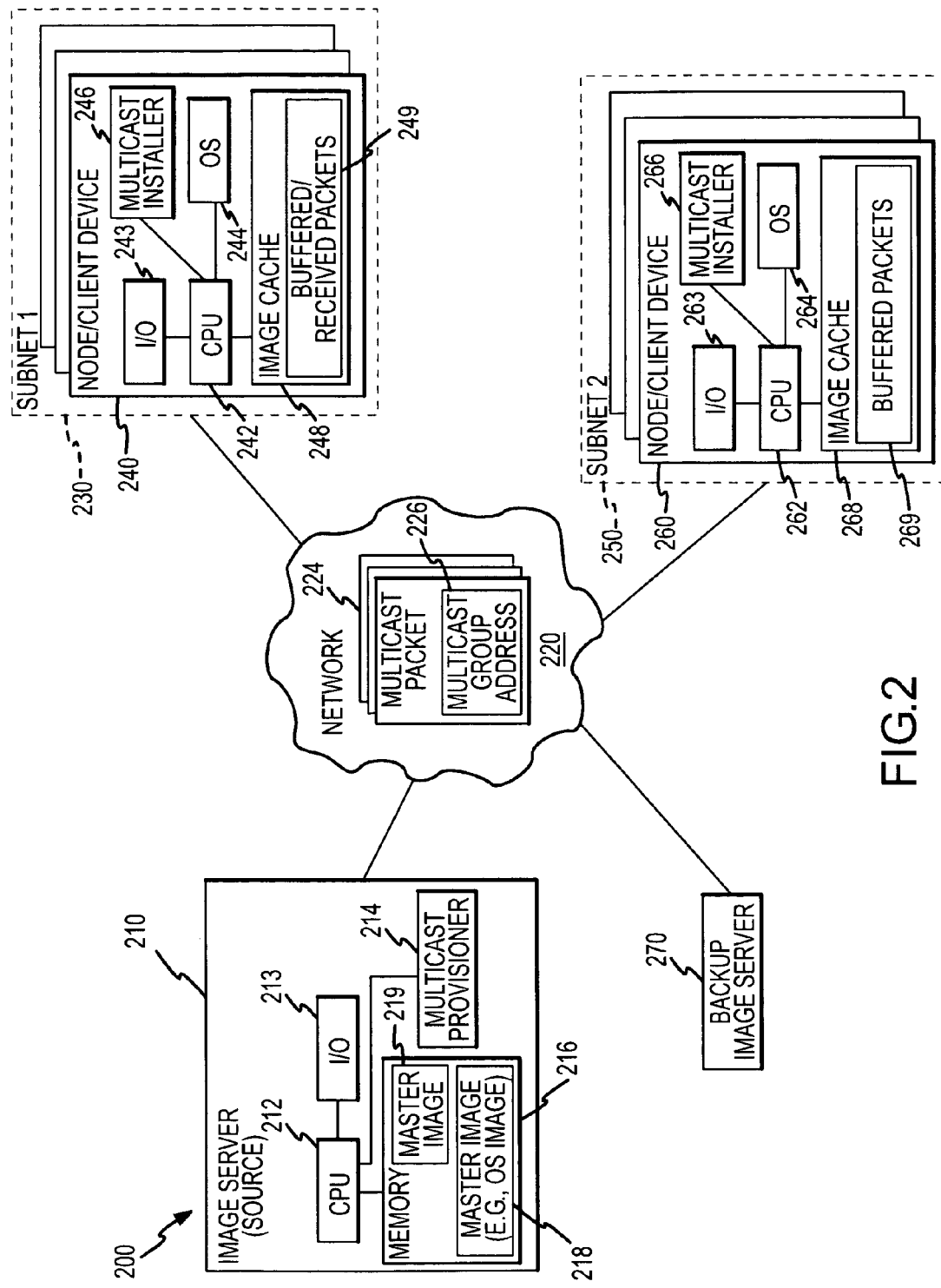
FIG. 2 illustrates in block form an exemplary OS provisioning system for multicast provisioning of an OS to a plurality of nodes or client devices in one or more subnets or sets linked to a digital communications network.

FIG. 2 illustrates another exemplary multicast provisioning system 200 configured according to the invention. A general tenet or feature of the invention is effective image provisioning by broadcast and more specifically, by multicast. To this end, the system 200 includes an image server 210 in communication with numerous nodes or client devices 240, 260 in subnets 230, 250 via communications network 220. The image server 210 may be nearly any computer or network device (not just a device labeled as a "server") configured for multicasting an image and is shown to include a processor or CPU 212, an input/output (I/O) component 213, and memory 216 (which in other cases may be provided in a separate device accessible by server 210). The memory 216 is used to store a first master image 218 which may be an OS image or other application that is to be provisioned over network 220. The image server 210 may be used to provision more than one image, and as such, a second master image 219 is shown, which may be broadcast to the same subnet or to a differing subnet than the first master image. As will be explained in detail, the image server 210 runs a multicast provisioner 214 that functions to communicate with the nodes 240, 260 in subnets 230, 250 and, significantly, to perform multicast provisioning of the master image 218 or 219 (for example, see the provisioning method described in FIG. 5).

Each subnet 230, 250 includes one or more nodes 240, 260 that each may be a typical computer or network device with the illustrated device having a CPU 242, 262 and an I/O component 243, 263. The nodes 240, 260 are shown to be running bootstrapping OS 244, 264, respectively, which are frequently installed in nonvolatile memory such as BIOS or a BOOT PROM, and to be running a loaded multicast installer 246, 266. Briefly, the multicast installer 246, 266 listens on the network 220 for multicast packets 224 having a multicast group address 226 corresponding to the particular node 240, 260 (or, more accurately, to the particular subnet 230, 250 to which the node 240, 260 belongs for provisioning purposes in system 200). Each node 240, 260 also includes memory or image cache 248, 268 that is used during provisioning operations in the system 200 to store or buffer packets 249, 269 that are identified on the network 220 with an appropriate multicast group address 226. The operation of the installer 246, 266 is described in more detail in the following paragraphs. The system 200 further includes a backup image server 270 that is configured similarly to server 210 to act as a slave or backup to image server 210 to continue the broadcast of multicast packets 224 upon a determination by the server 270 (or nodes 240, 260) of the loss of the master broadcast node or server 210.

A general tenet or feature of the system 200 is the ability for the multicaster provisioner 214 to begin broadcasting a specific system image 218 or 219 to a multitude of receivers 240, 260 to relieve traffic congestion on that image server 210, as compared with an image server operated in traditional discrete and individual request/respond models (e.g., unicast models). In the multicast model of system 200, a single server 210 broadcasts the bits that make up a system image 218 or 219 as multicast packets 224 to a specific subnet 230, 250 of nodes 240, 260. The packets 224 are multicast by the multicast provisioner 214 with a multicast group address 226 to define the appropriate subnet 230, 250 to which delivery of the packets 224 is proper (as may be determined by a router, switch, or other device in network 220 but not shown in FIG. 2).

In the subnet 230 or 250 receiving the packets 224, listeners or nodes 240 or 260 act to identify the packets 224 based on the address 226 such as by operating the multicast installer 246, 266. The multicast installer 246, 266 acts to verify the packets 224 and to buffer or cache each packet 249, 269, in image cache or memory 248, 268. The received packets 249, 269 are tracked by the installer 246, 266 until a critical point in the provisioning process has been achieved such that the client or node 240, 260 can move to a desired provisioned state or until all packets are received (such as by determination of receipt of both a start and an end of file with or without further verification of receipt of all bits/packets of an image). At this point, the installer 246, 266 acts to load the image provided by the packets 249, 269 (such as an OS 246, 266).

The installer is a small piece of code, either in compiled form or delivered in a source code or intermediate format that is then target compiled. Then it is typically installed in a computing device that serves to allow the computing device to install or verify the existing installed operating image based upon data that it receives from the network either in the form of a byte-wise comparison or as a set of CHECKSUM values. Upon startup, the installer can be instructed to proceed with verification, to wait for a trigger from the network, or to proceed without verification (typically, to speed the booting process where the image is not changing frequently). Changing this session can be accomplished either through an interaction with the client computing device or through the installation of a booting agent which can then be subsequently used by the server to configure the client settings. The installer may be modular, allowing itself, or pieces of itself, to be networked provisioned, thereby allowing site-local settings to be reflected in the installer's behavior. These settings may include authentication models, tokens and keys, encryption libraries, network/network device parameters or interface software as well as orchestration steps. The installer can furthermore be cascading allowing an initial bootstrap to load a subsequent installer, who might then load an OS image. This may be useful where the installer code exceeds memory/storage limitations on the client device.

Figure 3:
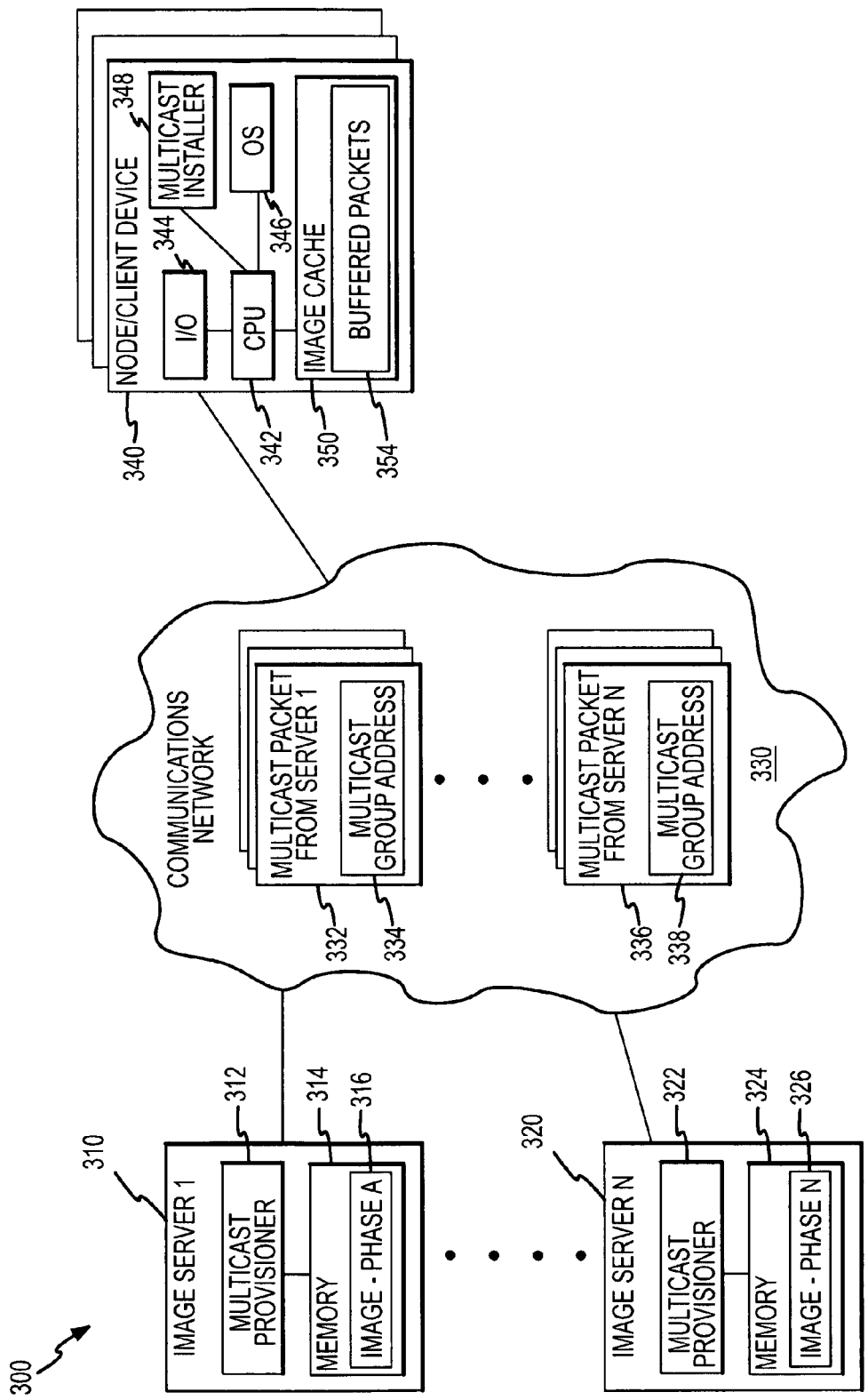
FIG. 3 is another example of an OS provisioning system similar to the system of FIG. 2 but configured to illustrate the use of two or more devices for serving or provisioning phases or portions of an OS image to networked nodes or client devices.

FIG. 3 illustrates another provisioning system 300 of the present invention. The system 300 includes components similar to that of system 200 and hence, some of these components are shown with less detail for simplicity of explanation but may take forms similar to those of system 200. The system 300 is configured for multicasting of a single image by multiple image servers 310, 320 to nodes/client devices 340 over communications network 330. Each node 340 is similar to nodes of FIG. 2 with a CPU 342, an I/O 344, a running OS 346, and a multicast installer 348 that operates to listen for packets on network 330 that have one or more multicast addresses corresponding to multicast groups for which the node 340 is a member. Packets with such group addresses are stored in image cache 350 as buffered or received packets 354, until an adequate number are received to enter a particular provisioning state. At that point, the installer 348 acts to load the image 345, such as to load a new OS 346 using the packets 354.

Each image server 310, 320 runs a multicast provisioner 312, 322 to broadcast a particular phase 316, 326 stored in server memory 314, 324. The images 316, 326 are broadcast as multicast packets 332, 336 over network 330 and include multicast group address 334, 338, which in this case are the same as the packets from each phase image 316, 326 are intended for the same group of nodes 340. The nodes 340 receive the packets associated with each image phase 316, 326, stores these packets 354 in cache or memory 354, and then, loads the image represented by the packets 354 (such as acting to load a new as 346, for example). In this manner, there is no single master server in system 300 but instead multiple servers 310, 320 are responsible for each of a number of discrete phases or portions of a particular image (i.e., a master image of an OS or the like). Although not shown, a backup server(s) could be provided in the system 300 as shown for system 200.

Figure 4:
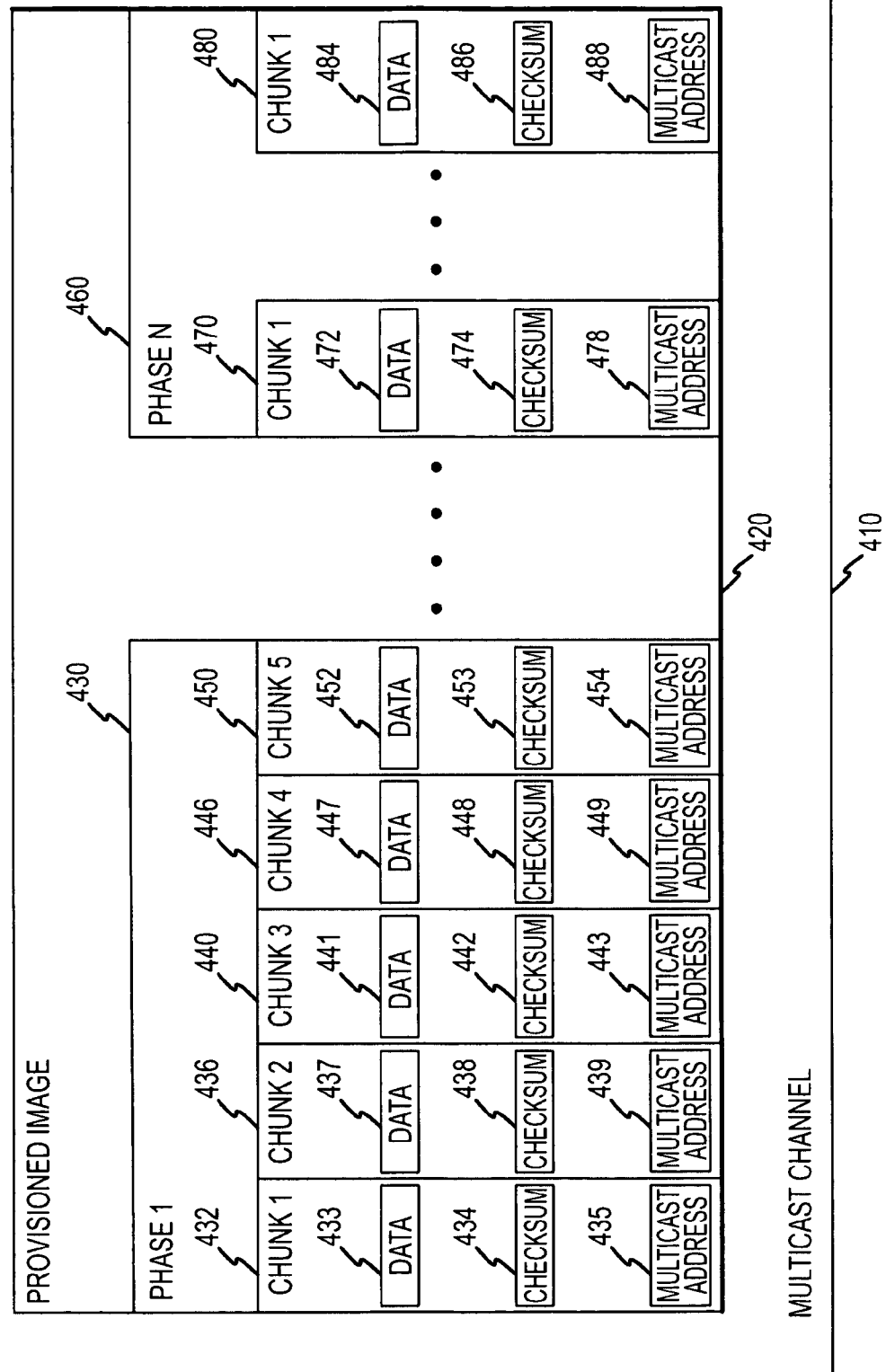
FIG. 4 is a simplified block diagram of a provisioned image as it may be transmitted over a multicast channel (e.g., over a digital communications network) to clients or nodes.

With reference again to FIG. 2 and with additional reference to FIG. 4, the image server or source 210 continues during provisioning to loop through the image 218 or 219 being broadcast on network 220 to subnet 230 or 250. To facilitate effective tracking of transmission by provisioner 214 and receipt by installer 246, 266, it is desirable in some embodiments to transmit the image 218, 219 into a "chunked" system image by the provisioner 214 prior to transmittal in packets 224 over network 220. For example, the image, e.g., an OS image, 218 or 219 may be broken up into "phases" or portions and each of these phases may then be further broken into chunks or subsets of bits.

One exemplary technique of such a chunked image is shown in FIG. 4. A provisioned image 420 is shown as it is broadcast or multicast over a multicast channel 410. As shown, the image 420 is transmitted in phases 430, 460, which are further broken down into chunks 432, 436, 440, 446, 450, 470, 480 with 5 chunks being shown for illustration purposes but not as a limitation as more or fewer chunks may be used (as shown in phase 460). Each chunk includes an amount of data 433, 437, 441, 447, 452, 472, 484 that may be provided in one or more packets. The provisioner 214 and installers 246, 266 implement a versioning and ordering scheme that is designed to ensure that a change in broadcasted version (or specific target version) can be recognized and, significantly, that the phase and chunk number (within that phase) can be re-constituted in appropriate order. Further, each chunk includes a checksum 434, 438, 442, 448, 453, 474, 486. The checksum is verified by the installer 246, 266 to allow for bit failures without terminal results.

The use of phases and chunks allows the installer 246, 266 to verify that in a repeating stream of packets 224 from provisioner 214 that if a receiving client 240, 260 begins buffering an image midstream that the received image is later completed. In a 5-chunk per phase example, a receiving installer 246, 266 may start listening with the receipt of a fourth and fifth chunk of a phase followed by an end-of-file (eof). The installer 246, 266 then waits for additional blocks or chunks including the first chunk and/or start-of-file (sof) and a second and a third chunk. The receiving installer 246, 266 then recognizes or determines that all chunks for the phase (and in most cases, all phases for an image), and the installer moves to the next allowable state, e.g., proceeds with loading the received image.

The use of image caches 248, 268 at each node or client device provides peer caching services or a caching architecture that addresses problems with missing starting blocks and reduces time to provision. A worst or bad operating case for provisioning in system 200 is when a critical starting block for a given phase has been missed by the multicast installer 246, 266. In this case, the multicast installer 246, 266 acts to initiate a multicast bootstrapping process in which the installer 246, 266 proceeds with caching packets or received chunks 249, 269 in cache or memory 248, 268 until the "critical-to-proceed" chunks are received at the node 240, 260. At this point (as determined by multicast installer 246, 266), bootstrapping at that boot phase can proceed.

Blocks or chunks that do not properly checksum can either be waited for by the installer 246, 266 or can be specifically requested by the installer 246, 266. The request may be sent to the broadcasting image server 210 or 270 (sometimes thought of as the "bootstrapping server") or be broadcast to other nodes 240, 260 in the subnet 230 or 250 where a peer client or node can respond. Depending on the size of the provisioned phase, it may be substantially faster to request the 1, 2, or more missing blocks or chunks rather than waiting for those blocks to again be transmitted by the image server 210 or 270 as part of its looping multicast of an image in packets 224 on network 220.

Upon completion of a phase or image, the client 240, 260 with the installer 246, 266 optionally may function to signal the broadcaster 214 of successful completion so that the broadcaster 214 can stop broadcasting of a phase when all nodes 240, 260 in a subnet 230, 260 indicate successful receipt. To prevent indefinite broadcasting by multicast provisioner 214, in some embodiments, the lease of a node 240, 260 on a given phase is released after a pre-agreed or preset interval of time that is known to both the client 240, 260 and to the image server 210, 270. Cross subnet broadcasting can occur through reliable transports (e.g., reliable multicast, TCP, or the like) should secondary boot masters, such as server 270, be necessary. It is further possible that clients 240, 260 that are awaiting specific packets may respond to broadcast requests for missing packets to ease the load on the master image server 210, 270.

The provisioning carried out by system 200 may include a secure-image model. In these secure provisioning models, the client 240, 260 acts to leverage a key request mechanism. The client 240, 260, such as with the installer 246, 266 or additional components (not shown), then decrypts received chunks upon a correct checksum.

In some embodiments, the multicast installer or receiver 246, 266 may be set up as a proxy process for a traditional I/O device, thereby allowing many existing provisioning processes to be implemented with minimal customization. For example, the multicast receiver 246, 266 may be configured to mimic a hard disk, a CD-ROM, or a network volume that is responding to the fopen/fread commands as critical data becomes available unbeknownst to the heritage client on node 240, 260 that the caching cycle is going on in the background.

Further, the provisioning system 200 may implement provisioning processes using discovery, lookup, and/or lease models. For example, models similar to Jini™ technology that enables the interactions between the clients 240, 260 and the image server 210 or 270 to be better managed. In some cases, the provisioning system 200 may allow in this fashion strong client tracking and the switch on/off of the broadcast stream as specific clients 240, 260 either join or complete using simple counters and timeouts, e.g., counters and/or timeouts accessed by the multicast provisioner 214.

Figure 5:
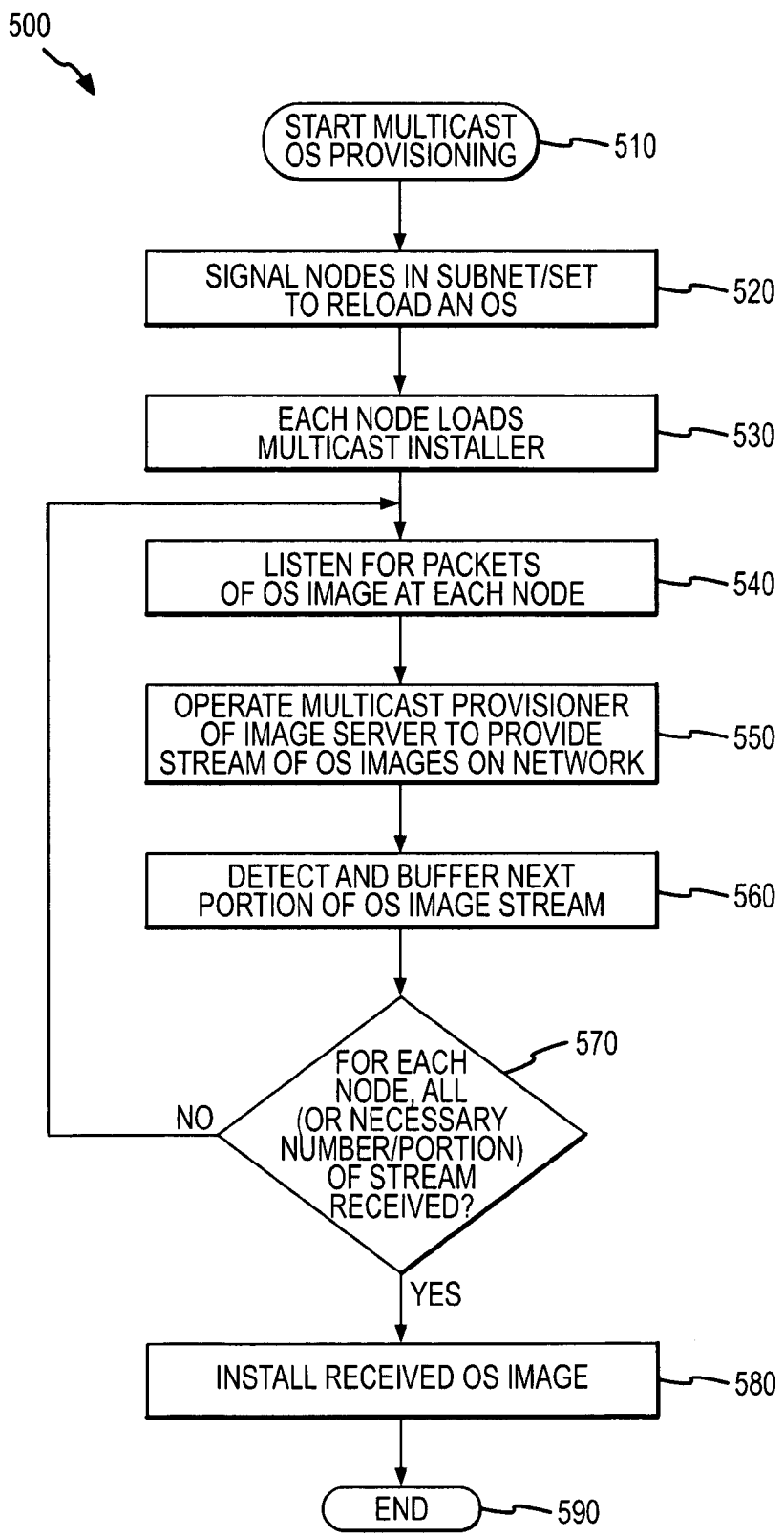
FIG. 5 is a flow diagram of a method of performing multicast provisioning (i.e., OS provisioning) according to an embodiment of the invention such as may be achieved by operation of the systems of FIGS. 1-3.

FIG. 5 illustrates a provisioning process 500 that may be carried out by operation of the systems 100, 200, 300, and in this example, the process 500 is used for multicast provisioning of an OS image to a plurality of nodes or clients. The provisioning 500 begins at 510, which may include establishing multicast groups of nodes such as nodes on a subnet for receiving updates or reloads of a particular OS (i.e., all devices on a network that run the OS) and establishing a multicast address for each of these groups. Initiation or loading of a multicast provisioner on an image or master server occurs at 510 along with storing of a master image of the OS to be provisioned. As discussed above, the image may be divided into 2 or more distinct phases and each of these phases may further be divided into chunks to facilitate effective receipt of the entire image as it is streamed over a digital communications network.

At 520, the method 500 continues with the multicast provisioner signaling the nodes in a multicast group or subnet that a reload of the OS is about to begin or is necessary/recommended. At 530, each of these nodes loads (if it is not already preloaded) a multicast installer. The preloaded or later loaded installer is then run on the node and acts at 540 at each node to listen for packets of the OS image as it is multicast on a communications network, e.g., each installer is looking for packets having a particular multicast group address (i.e., an address matching the group address associated with the subnet or multicast group which the node is a member). At 550, the multicast provisioner operates on an image server to begin to provide or broadcast a stream of OS images on the network. Typically, this will involve broadcasting a plurality of packets with the group address corresponding to discrete phases and chunks within such phases.

At 560, the method 500 includes the multicast installer detecting and then buffering a next portion of the OS image stream. For example, a data packet or chunk with the group address may be detected and when detected (and sometimes checksum verified), the received data is cached or buffered in the memory of the node. The installer then at 570 determines whether all (or a necessary number or subset) of the image stream have been received at the node. If not, the method continues at 540 with listening for additional data. In some cases, an additional step or steps may be provided in method 500 to request missing portions or chunks of a phase from the sending image server and/or from peers in the subnet that are caching the stream, too. At 580, the multicast installer acts to install or load the received OS image and this may include sending a message or signal to the multicast provisioner indicating receipt of all or necessary packets from the image server. At 590, the method 500 ends and the installer may be removed from the node, with reloading or a call being made when a next provisioning begins.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed. For example, purpose installed redistribution points may be installed to bridge disparate networking fabrics where broadcast could not be delivered or properly secured. These re-distribution points could be purpose built servers or potentially, caching clients who then act as distribution servers.

We claim:

1. A method for provisioning a computer application to nodes in a computer network, comprising:

receiving, at each of a plurality of nodes that are communicatively linked to a digital communications network, a signal from an image server;

in response, loading a multicast installer on each of the plurality of nodes;

at each of the nodes, operating the multicast installer to listen for and identify multicast packets having a particular multicast group address on the network, wherein each of the multicast packets represents a portion of a provisioned image, and wherein the provisioned image is divided into two or more phases that are each divided into two or more chunks, with the multicast packets providing data for the chunks of the phases;

at each of the nodes, caching the identified multicast packets according to an ordering scheme that allows the phases and the chunks to be reconstituted in an appropriate order;

at each of the nodes, determining with the multicast installer that the cached multicast packets represent a minimum portion of a provisioned image to proceed to a provisioning state, wherein the minimum portion represents less than an entirety of the provisioned image; and at each of the nodes, when the minimum portion is determined, installing the cached multicast packets in non-volatile memory.

2. The method of claim 1, wherein the provisioned image comprises an image of an operating system to be loaded on each of the nodes.

3. The method of claim 2, wherein the multicast group address corresponds to the image of the operating system.

4. The method of claim 2, wherein the multicast group address corresponds to a subnet comprising the plurality of nodes.

5. The method of claim 1, the method further comprising operating a multicast provisioner on the image server to broadcast a plurality of the multicast packets corresponding to the provisioned image stored on the image server.

6. The method of claim 1, wherein the provisioned image is provided more than once on the network, and wherein the multicast installer on each node determines if any of the chunks of one or more of the phases are missing in the memory and if so, continuing the listening until the minimum portion is determined.

7. The method of claim 6, further comprising requesting the missing chunks from an image server broadcasting the multicast packets or from another one of the nodes with the cached multicast nodes.

8. The method of claim 1, further comprising operating the multicast installer at each node to verify each of the chunks by performing a checksum.

9. A multicast provisioning system for provisioning an operating system, comprising:

an image server linked to a digital communications network having memory storing an image of the operating system;

a multicast provisioner running on the image server to multicast the operating system image on the network, the broadcast operating system image defining a multicast group address; and a plurality of client devices linked to the network, each of the client devices comprising:

a multicast installer listening for data packets on the network having the multicast group address;

cache memory to buffer data packets identified as having the multicast group address, wherein the multicast installer determines a critical point at which the buffered multicast packets represent a minimum portion of the provisioned image required to proceed to a provisioning state, and wherein the minimum portion represents less than an entirety of the provisioned image; and non-volatile memory, wherein the multicast installer installs the buffered multicast packets in the non-volatile memory at any point after the critical point is reached.

10. The system of claim 9, wherein the broadcast operating system image is provided on the network in at least two phases, wherein each of the phases comprises at least two chunks of data, and wherein the multicast installer monitors receipt of each of the chunks of data to track transmission of the operating system image.

11. The system of claim 10, wherein each of the chunks comprises the multicast group address.

12. The system of claim 11, wherein each of the multicast installers determines for each of the phases whether a minimum set of the chunks for the phase have been received at the client and when the minimum set is determined to be received, the multicast installer installs the corresponding phase of the operating system image.

13. The system of claim 12, wherein each of the multicast installers buffers in memory of the corresponding client device the chunks of the phases of the broadcast operating system image identified on the network as having the multicast group address.

14. The system of claim 13, wherein each of the multicast installers operates to identify a missing one of the chunks and in response to transmit a request on the network for the missing one of the chunks to the image server or to another one of the client devices.

15. The system of claim 11, the system further comprising additional image servers equal in number to the phases of the operating system image, wherein each of the phases is stored in memory of a differing one of the image servers and wherein each of the image servers comprises a multicast provisioner broadcasting the phase stored in the memory of the image server on which the multicast provisioner is running over the network.

* * * * *